(12) United States Patent
Epstein

(10) Patent No.: US 11,937,095 B2
(45) Date of Patent: Mar. 19, 2024

(54) WIRELESS NETWORKING DEPLOYMENT SYSTEM AND METHOD

(71) Applicant: Omnifi Inc., Pleasanton, CA (US)

(72) Inventor: Joseph Alan Epstein, Pleasanton, CA (US)

(73) Assignee: Omnifi Inc., Pleasanton, CA (US)

( * ) Notice: Subject to any disclaimer, the term of this patent is extended or adjusted under 35 U.S.C. 154(b) by 0 days.

(21) Appl. No.: 17/115,706

(22) Filed: Dec. 8, 2020

(65) Prior Publication Data

US 2021/0112422 A1   Apr. 15, 2021

Related U.S. Application Data

(63) Continuation of application No. PCT/US2020/022174, filed on Jun. 18, 2020.

(60) Provisional application No. 62/817,461, filed on Mar. 12, 2019.

(51) Int. Cl.
*H04W 16/18* (2009.01)
*H04B 3/54* (2006.01)
*H04W 84/12* (2009.01)

(52) U.S. Cl.
CPC ............ *H04W 16/18* (2013.01); *H04B 3/54* (2013.01); *H04W 84/12* (2013.01)

(58) Field of Classification Search
None
See application file for complete search history.

(56) References Cited

U.S. PATENT DOCUMENTS

| 7,231,224 B1* | 6/2007 | Chesson | H04W 88/08 455/523 |
| 8,705,967 B2 | 4/2014 | Beach | |
| 10,716,016 B2* | 7/2020 | Goldsmith | H04W 24/02 |
| 2007/0197262 A1* | 8/2007 | Smith | H04L 12/2803 455/562.1 |

(Continued)

FOREIGN PATENT DOCUMENTS

| CN | 106559099 | 4/2017 |
| JP | 2015050517 A | 3/2015 |

(Continued)

OTHER PUBLICATIONS

European Patent Office, Extended European Search Report for Application No. 20770869.4-1216, dated Nov. 16, 2022, 9 pages.

(Continued)

*Primary Examiner* — Lonnie V Sweet
(74) *Attorney, Agent, or Firm* — Baker Botts L.L.P.

(57) ABSTRACT

A method and system for constructing and delivering wireless networking, according to some embodiments. Some embodiments embed wireless transceivers into light bulbs and small wall-pluggable devices. Some embodiments use a strip or plane of material embedded with wireless transceivers, power, and networking. Some embodiments use a strip or plane of material embedded with antennas, often switchable. In some embodiments, multiple Wi-Fi systems are surface mounted on a strip that includes networking and power. In some embodiments, a head end is used to interface the strip to the remainder of the network and the main power supply. An over deployment resource manager is disclosed.

22 Claims, 20 Drawing Sheets

(56) References Cited

U.S. PATENT DOCUMENTS

| | | | |
|---|---|---|---|
| 2008/0013558 A1* | 1/2008 | Ito | H04W 36/08 370/404 |
| 2008/0157957 A1* | 7/2008 | Pitchers | G01S 5/02 340/539.1 |
| 2009/0204805 A1* | 8/2009 | Robba | H04L 63/0485 713/153 |
| 2012/0099481 A1* | 4/2012 | Dong | H04W 16/18 370/255 |
| 2012/0170558 A1* | 7/2012 | Forbes | H04W 88/08 370/338 |
| 2012/0235881 A1 | 9/2012 | Pan | |
| 2013/0028605 A1 | 1/2013 | Beach | |
| 2015/0105121 A1* | 4/2015 | Emmanuel | H04W 74/002 455/553.1 |
| 2015/0123873 A1* | 5/2015 | Perumana | H01Q 3/24 343/876 |
| 2015/0264535 A1* | 9/2015 | Mak | H04W 4/029 455/456.1 |
| 2016/0127027 A1* | 5/2016 | Ling | H01Q 3/267 398/115 |
| 2016/0282445 A1* | 9/2016 | Kawamoto | G01S 5/02523 |
| 2017/0093032 A1 | 3/2017 | Khoury et al. | |
| 2017/0222275 A1* | 8/2017 | Krishnan | H04L 61/2038 |
| 2018/0076515 A1* | 3/2018 | Perlman | H04B 1/40 |
| 2018/0192346 A1* | 7/2018 | Nagasaka | H04W 36/0022 |
| 2019/0058242 A1* | 2/2019 | Tabe | H01Q 1/248 |
| 2019/0190631 A1* | 6/2019 | Gleditch | H04W 4/42 |

FOREIGN PATENT DOCUMENTS

| | | |
|---|---|---|
| WO | WO 2020185953 A1 | 9/2020 |
| WO | 2021092018 A1 | 5/2021 |

OTHER PUBLICATIONS

Japanese Patent Office, Application No. JP 2021-555064, Office Action dated Jan. 10, 2023, 2 pages (5 total pages with included English translation).

Intellectual Property Office of Singapore, Search Report and Written Opinion for SG Application No. 11202109766W, dated May 26, 2023, 8 pages.

Japan Patent Office, Office Action for JP Application No. 2021-555064, dated Jul. 25, 2023, 3 pages.

Notice of Allowance for JP2021555064, dated Jan. 9, 2024, 5 pages.

* cited by examiner

WIRELESS NETWORKING DEPLOYMENT SYSTEM AND METHOD

BENEFIT CLAIM

This application claims the benefit under 35 U.S.C. § 120 as a continuation of PCT international application PCT/US2020/022174, filed Jun. 18, 2020, which claims the benefit of provisional application 62/817,461, filed Mar. 12, 2019, the entire contents of which is hereby incorporated by reference for all purposes as if fully set forth herein.

BACKGROUND OF THE INVENTION

1. Field of the Invention

The present invention relates to the field of manufacturing, distributing, installing, and operating wireless networks.

2. Description of the Prior Art

Existing techniques for creating and deploying Wi-Fi networks today involve installing several individual wireless access points, connected back to a switch by individual wired networking and power connections—usually Ethernet with power over Ethernet providing the power for the access points. The access points contain a small number of radios and are distributed and spaced throughout the area to be covered, usually an office building or similar, in such a way as to ideally ensure adequate radio coverage to all the commonly occupied areas of the deployment while otherwise minimizing the number of access points. These two goals—adequate coverage and minimizing the number of access points—are inherently in conflict, and so the installer tries to find an adequate compromise for the installation, often having to go back and update the locations or numbers of access points to fill holes or provide for density.

Every step of that process is expensive. Enterprise-grade access points are pricy, and even if they are given at a discount from the often $1,000 or more list price—even if they are sold at $100 each—the cost is certainly not such that an installer can, say, double or triple the number deployed to ensure that coverage holes are simply impossible. The labor required to pull cable from the wiring closet directly to where each access point is installed is expensive. Climbing a ladder and mounting the access point to a wall or ceiling, usually on a special mounting bracket, is expensive. The power over Ethernet switch port in the wiring closet that serves the wire running from the access point is expensive. The wiring of the wiring closet is expensive. The licenses needed to operate the access point are expensive. Any controller appliances that manage the access points are expensive.

In short, the labor and material costs required to place one access point ensures that a customer must keep track of and know about each access point, and thus forces the customer to rationalize or keep reduced the number of access points deployed. Moreover, even if a customer so desires to flood the area with an excess number of access points, this would go against manufacturer recommendations (stated or implied), as radio-to-radio contention and interference prevents the network from operating efficiently or the algorithms in place today to tune the network from doing their job.

The problem is that each access point is a discrete, tracked, named, and valuable asset. Some attempts have been made to reduce some of the pain. For example, some access points have multiple ports, and can even pass through a degree of power from one port to the other. Thus, an installer could daisy-chain the access points together, and thus avoid a home run to the wiring closet for each access point. However, access points are not designed to handle more than one or two daisy-chained, because the AP itself would lose bandwidth and supplied power on the wired network.

SUMMARY

In accordance with some embodiments, a method and system for constructing and delivering wireless networking are provided. Some embodiments increase the density well beyond that cost-effectively available today by embedding or using existing embedded wireless transceivers in common, often commodity, devices such as light bulbs. Some embodiments use a potentially long strip or plane of material embedded with wireless transceivers, power, and networking. Some embodiments use a potentially long strip or plane of material embedded with antennas, often switchable, thus providing far more opportunities for a transceiver to choose physical points of transmission and reception.

DETAILED DESCRIPTION

One theme connecting many of the embodiments of this invention is leveraging methods for increasing the density of available wireless transmission locations, thus potentially allowing electronic reconfiguration of the physical layout of the wireless network without requiring human intervention or physical relocation of actual discrete assets. A possible advantage of the form factors discloses is that they may be easily integrated into an architectural or wiring plan and can be installed by electricians rather than skilled networking labor.

Figure 1:
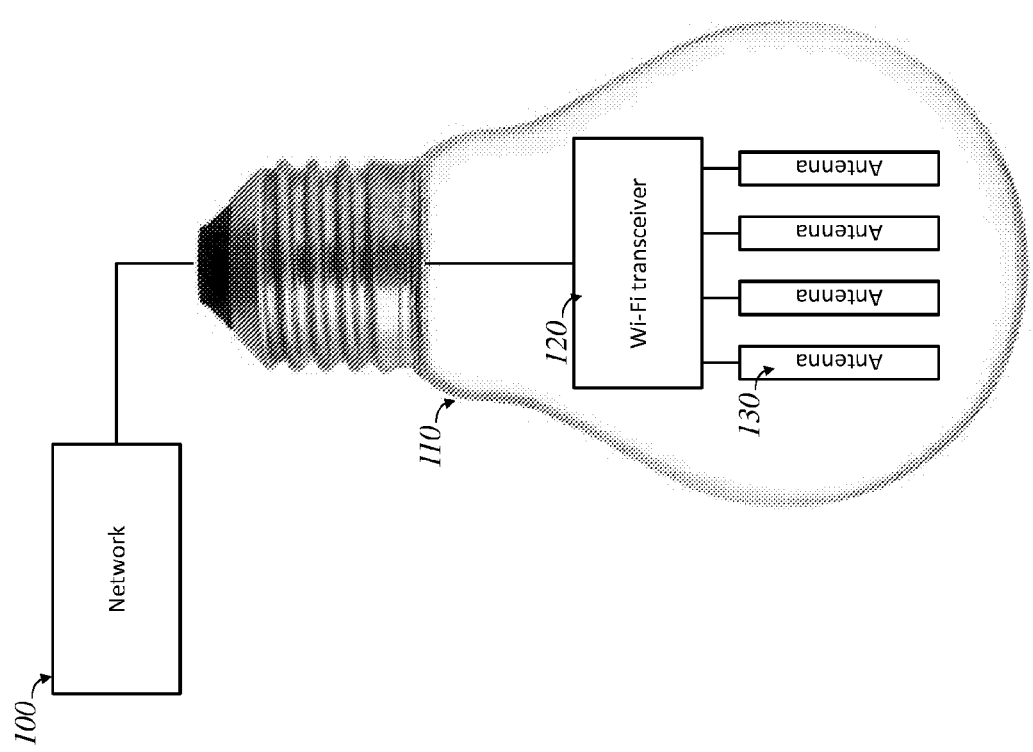
FIG. 1 is a diagram of an embodiment of the invention, showing a wireless transceiver and embedded antennas in a light bulb.

FIG. 1 shows the generic architecture of a wireless lightbulb 110. A Wi-Fi transceiver 120 is presented. Usually, it is available as a complete system on a chip, meaning that it contains a CPU, memory, and an operating system, along with its radio and medium access control (MAC) layers. To be a lightbulb, it also has LEDs and a sufficient LED controller attached to the system-on-a-chip (SoC) so that the SoC can dim (usually by pulse width modulation) the LEDs based on network requests. Because the embodiment is not about merely a lightbulb, the lighting components are not illustrated in the figure. The Wi-Fi transceiver 120 operates as an access point, relaying information from network 100.

Figure 2:
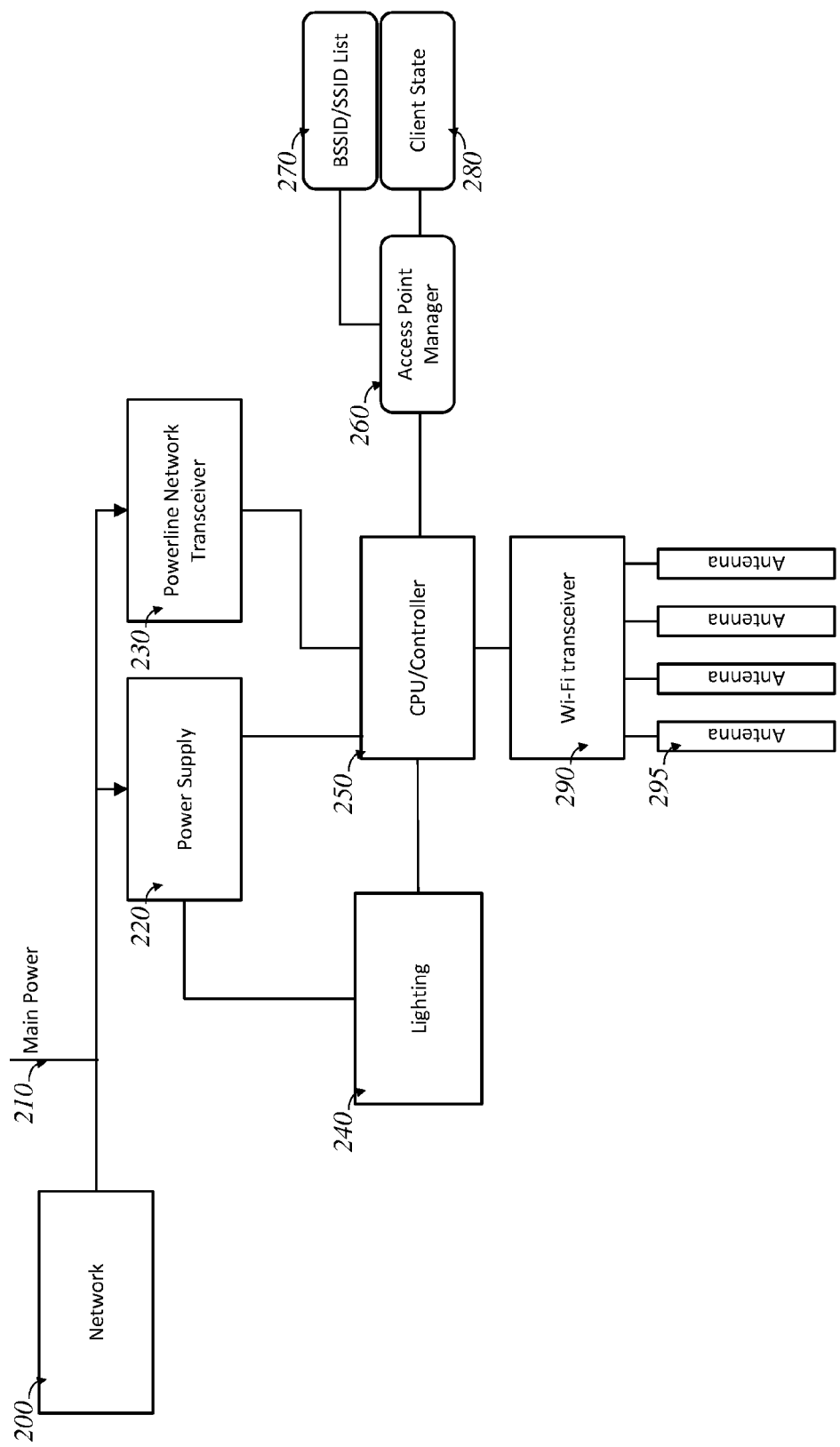
FIG. 2 is a diagram of an embodiment of the invention, showing a block diagram of a lighting-embedded wireless access point.

FIG. 2 shows an elaboration of the embodiment in FIG. 1. A network 200 is introduced using (usually but not necessarily high capacity) networking over powerline technology routed on main power 210. The bulb has a power supply 220, with enough capacity to drive its lighting and wireless needs. A powerline network transceiver 230 connects a CPU/Controller 250 to the wireline network 200. A Wi-Fi transceiver 290 provides generic Wi-Fi capability. Such transceivers are typically structured such that the CPU 250 handles the higher layer networking configuration and the transceiver itself is programmed by the CPU into adopting the correct wireless modes, such as how many BSSIDs to offer, what their addresses is (often through a base address and a mask), what radio settings are needed, and so on. Typically, in software on the CPU is an access point manager 260, which handles the association and state machines for each client, as well as a list of clients 280, and BSSIDs and SSID services offered 270. One or more antennas 295 are offered.

The illustration in FIG. 1 of a lightbulb as screw in is merely one embodiment, as lightbulbs come in many form factors, including plugin, snap on, and fluorescent tube bulbs (even if the replacement lighting technology is LED). Power and powerline networking technology in some embodiments works through a fluorescent ballast. Other embodiments are fitted with a standard two or three prong outlet plug, and thus plug into a power outlet: a further embodiment takes a nightlight configuration. Others wire directly in the power supply, such as through wingnuts in a junction box.

In other embodiments, the powerline networking element is not used, or not even present, and the Wi-Fi transceiver is used for mesh networking.

Lightbulbs as a literal form factor are not the only form factor possible. There are other places one can introduce access points. Merely by removing the lighting component from the lightbulb embodiments, one can have a "nightlight" without a light, that is merely a radio. Another embodiment is integrated into an outlet directly, wired in place of a standard outlet, a controllable smart outlet, or a GFCI outlet: each are different embodiments and carry the necessary features of a simple plug, being controllable, and having GFCI protection.

Inbuilt wireless such as with the above embodiments can be installed such that the antennas are not configured by the installer. Antenna patterns are often important, especially when devices are placed against ceilings or walls or fixtures. Having just one fixed antenna set would then become a problem if the resulting antenna pattern against the environment creates grossly misshapen cells that fail to adequately cover.

Figure 3:
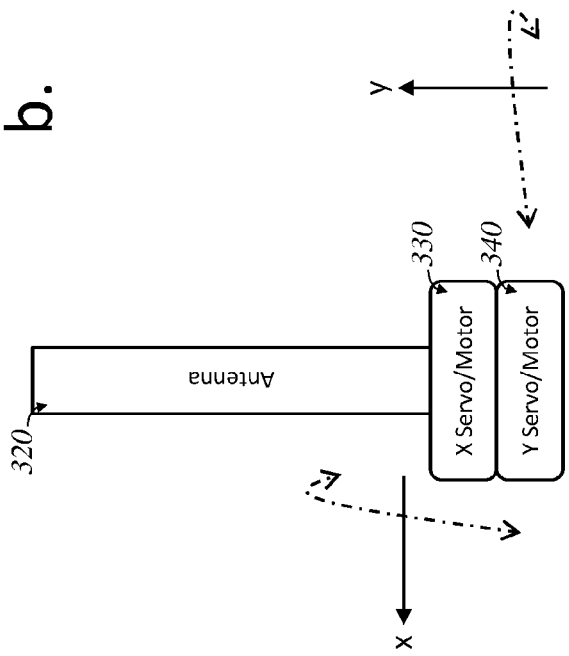
FIG. 3 is a diagram of an embodiment of the invention, showing an antenna which can be electronically reoriented.
Figure 3:
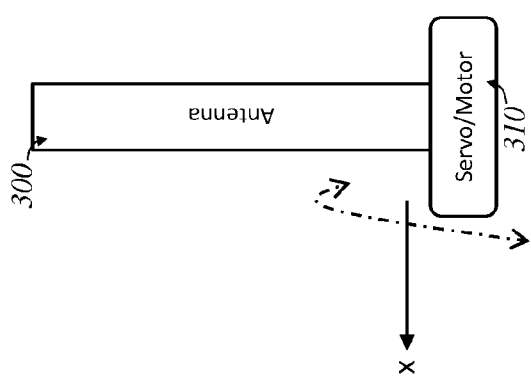

One set of embodiments solves this problem by using automatically movable antennas. FIG. 3 shows a couple of embodiments. FIG. 3a shows an antenna 300 mounted on an electrically movable apparatus 310, such as servo, motor, or electrically deformable material, with one axis of freedom. FIG. 3b shows two axes of freedom, by mounting one movable apparatus 330 on another 340 at a differing direction, such as cross. Omnidirectional antennas for Wi-Fi need only be a centimeter or two long, and the mechanical servos or motors needed are now able to be manufactured at extremely low cost and size. Thus, multiple movable antenna packages can be installed easily into a small form factor, such as within a lightbulb. Other embodiments use, instead of a servo or motor, a spring and variable-length strut to position the antenna: the variable-length strut can be a memory wire, a rack-and-pinion system, a solenoid, voltage sensitive material, or other similar mechanism. The choice of material is a manufacturing decision, and tradeoffs exist between power required to operate, cost, and complexity: such choices are obvious and require no experimentation or further invention. In some embodiments, multiple antennas are attached together to one moving mechanism.

Figure 4:
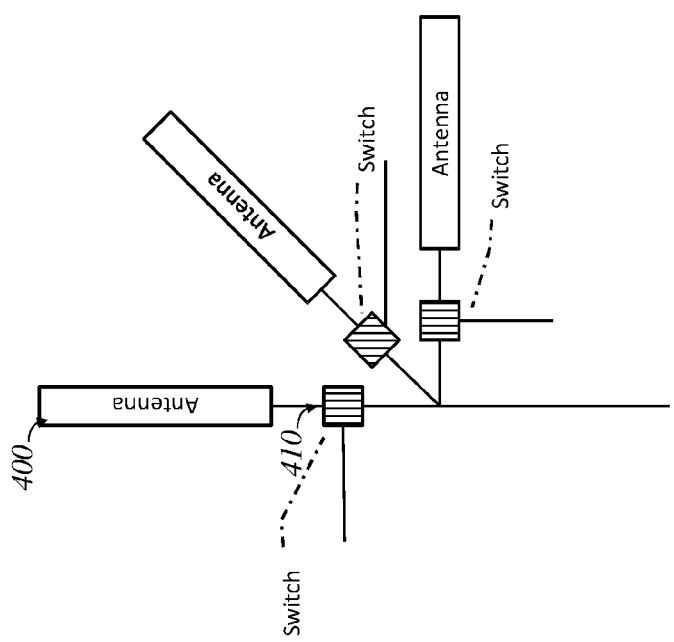
FIG. 4 is a diagram of an embodiment of the invention, showing an electronically selectable set of antenna options.

When mechanical motion is not desired, multiple antenna patterns can be switched between. FIG. 4 shows an embodiment of antenna switching. Multiple antennas are provided, at different orientations, locations, or in different shapes and patterns. In this figure, each antenna 400 is provided its own one-way switch 410: a reduced number of multiway switches can be provided instead. The antennas may be arranged in different directions, in two- or three-dimensional space. They may be independent wires, or they may be printed on plastic or solid circuit boards such as microstrip antennas. This is often very cheap to do. Some embodiments use the selections to provide enough antenna possibilities for each antenna that the system can search through the various antenna patterns and find an optimal one to use. A long time ago, in the earliest days of Wi-Fi, per-packet antenna switching was used, where the transceiver had enough time to compare the signal strength (usually the circuitry was not sufficiently sophisticated to measure much else) on multiple antennas during the throw-away training preamble, and the system could then choose which antenna it wanted to receive the main signal from. This was all done away with when the speeds were increased with OFDM, because there simply wasn't enough time to detect. And with MIMO, and multiple antennas running different signals, it wouldn't even make sense. However, that did not mean that antenna location is irrelevant. Instead, access points have their antennas prominently affixed today to their cases in places that provide reasonable orthogonality. (External antennas are somewhat rarer, because they tend to fall over time and thus change the pattern of the access point.) However, when access points are placed in physically constrained positions that prevent a priori placement—such as in lightbulb sockets or junction boxes—the need for remotely and automatically adjustable antennas returns, not for each packet, but for each placement, and then over time based on moving traffic patterns and similar.

Access points traditionally are placed with a high degree of care and precision, by planners and installers both. Ideally, one would rather place them in any convenient spot, and then run the antennas remotely to the optimal location. However, with MIMO, this is difficult to do with cabling: each antenna needs to be placed at a certain distance and with enough independence between the antennas to allow for capturing the independent spatial channels at the same frequency. Rarely would anyone want to pay enough to run two to four coaxial cables merely to dangle external antennas at the end of the coax: coax crimping tools are not common in an installer's toolbelt, and usually if you can run coax and place an antenna, you can put the access point at the same location instead and save the cost and effort. In fact, for this reason, most access points sold today contain internal antennas only.

Figure 5:
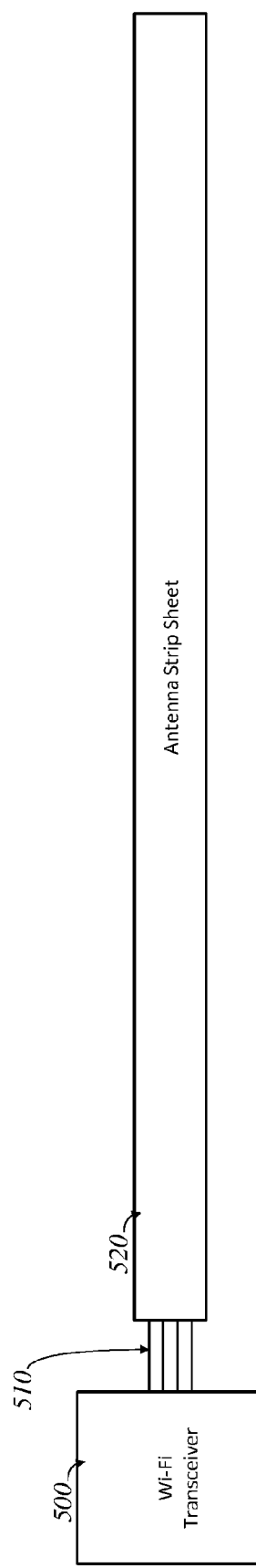
FIG. 5 is a diagram of an embodiment of the invention, showing an antenna strip sheet attached to a wireless transceiver.

However, this installation problem may be reduced by using sheets of cheap, possibly flexible, easy to install material with antennas embedded on it. FIG. 5 shows conceptually an antenna strip sheet. A Wi-Fi Transceiver 500 connects to a strip 520, through one or more lines 510 for one or more antennas. The strip sheet is then placed across the space to thus provide the multiple antenna location possibilities.

In some embodiments, the strip sheet is printed very much like an inexpensive LED lighting strip: a flexible circuit board, usually of plastic. In some embodiments, the strips are made of repeating units of addressable antenna sets, with supporting infrastructure. The antenna sheets mount to a head end unit in some embodiments, which depending on the embodiment drives various components from passive antennas to active transceivers in an addressable manner. The goal is to have these sheets come in long spools, which can be cheaply thrown about and cut as needed with little economic pain, thus allowing for unskilled installation and minimal cost for waste.

Figure 6:
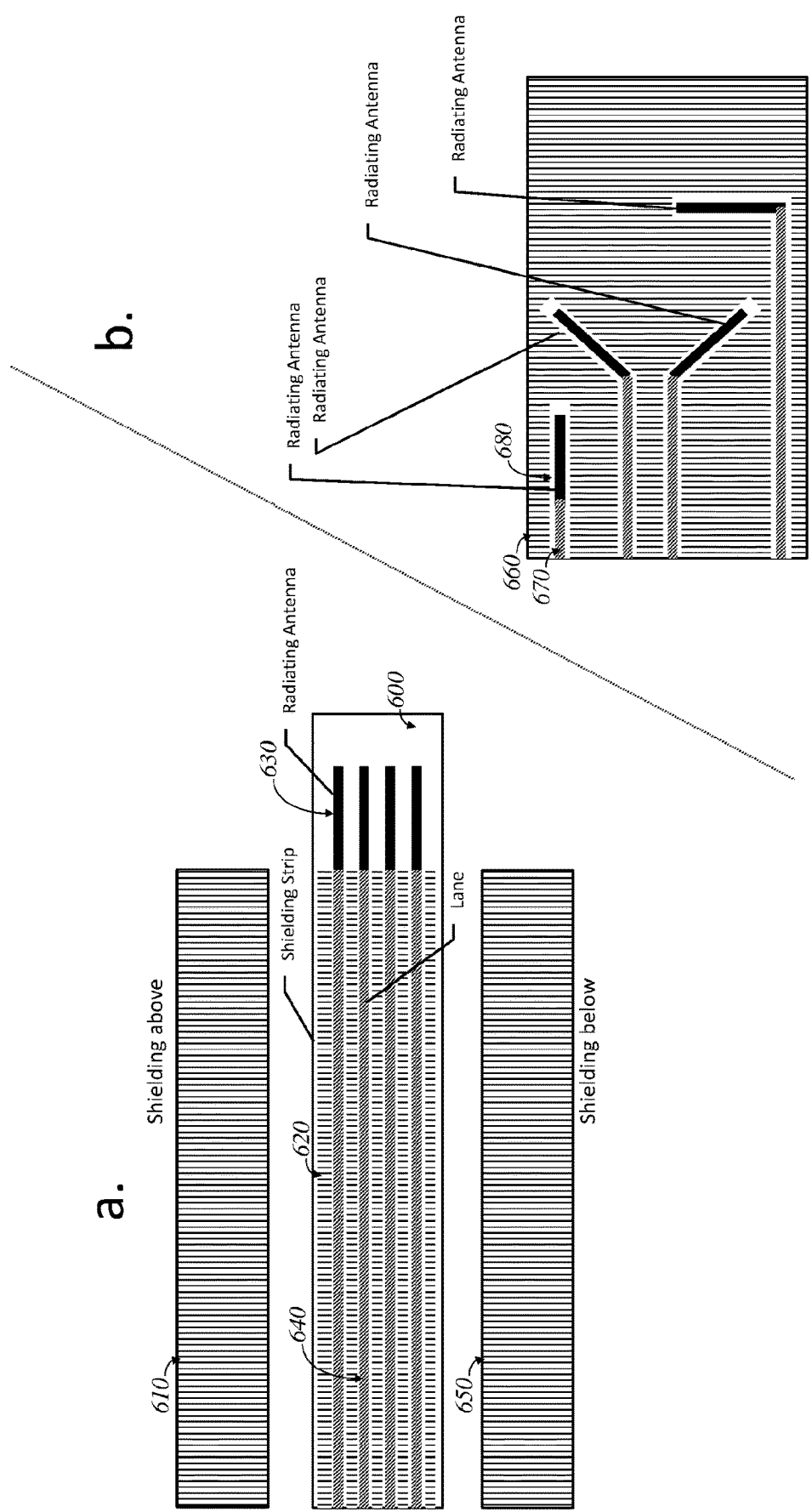
FIG. 6 is a diagram of an embodiment of the invention, showing multiple transmission lines terminating in radiating antennas, in both end span and midspan positioning on the strip.

In some simple embodiments, as shown in FIG. 6, the strip sheets have one antenna set. In some embodiments, the lanes 640 carry the signal for each antenna 630, surrounded by sufficient printed shielding lanes on the same plane 620, as well as stacked shielding on planes printed above 610 and/or below 650, to prevent radiation or absorption from the lanes themselves; in some embodiments, these are grounded and separated from the lanes by insulating space in the same plane or an insulating layer in another. In other embodiments, other shielding mechanisms are used. With shielding as shown in the figure, the bulk of the non-radiating part of the strip acts like an inexpensively made coaxial cable, but without the coaxial elements, or the cable, and thus can be manufactured using the same methods as LED strips. One possible advantage is that, like coaxial, the attenuation of the signal can be kept to near linear in the length of the antenna strip. The choice of width of shielding strips is easily made with no undue experimentation by those skilled in the art of microstrip transmission lines and can be chosen based on desired quality at a desired price. At the radiating locations, the shielding is omitted, and an appropriate radiating and impedance matched structure is used. In FIG. 6a, the four antennas are shown in parallel at an unshielded end of the strip: although illustrative, such adjacent aligned antenna options can be done, such as providing parallel PIFA antennas with principal radiating structures in the direction of the figure. However, in some embodiments, the antennas are placed with different orientations, patterns, and with different shielding and ground plane configurations. For example, FIG. 6b shows two sets of two orthogonal radiating antennas, surrounded by shielding material on the lane plane. (Again, although not illustrated in detail, PIFA antennas may be printed with such principal orientations.) Other embodiments use different lane plane shielding or omit the lane plane shielding at the radiating elements as in part a of the figure. Other embodiments remove one (say the top) layer of shielding above the radiating plane but leave the lower, to thus make the antennas radiate in a preferred direction orthogonal to the plane of the strip, as is typically done in patch antennas. The length of the radiating element that can be accommodated is potentially as large as the strip has room for in its longest dimension, although practical considerations, including a desire to create reasonable beam patterns, may constrain the length, array patterns, and the potential gain to be no more than a few dBi. The shape of the antenna is also a choice based on need. In some embodiments, there are more than one radiating element attached to the lane: some embodiments do this to allow for different pattern expressions; others do this to allow for different frequency responses, such as having multiple lengths for multiple optimal resonances based on the frequency bands used.

Figure 7:
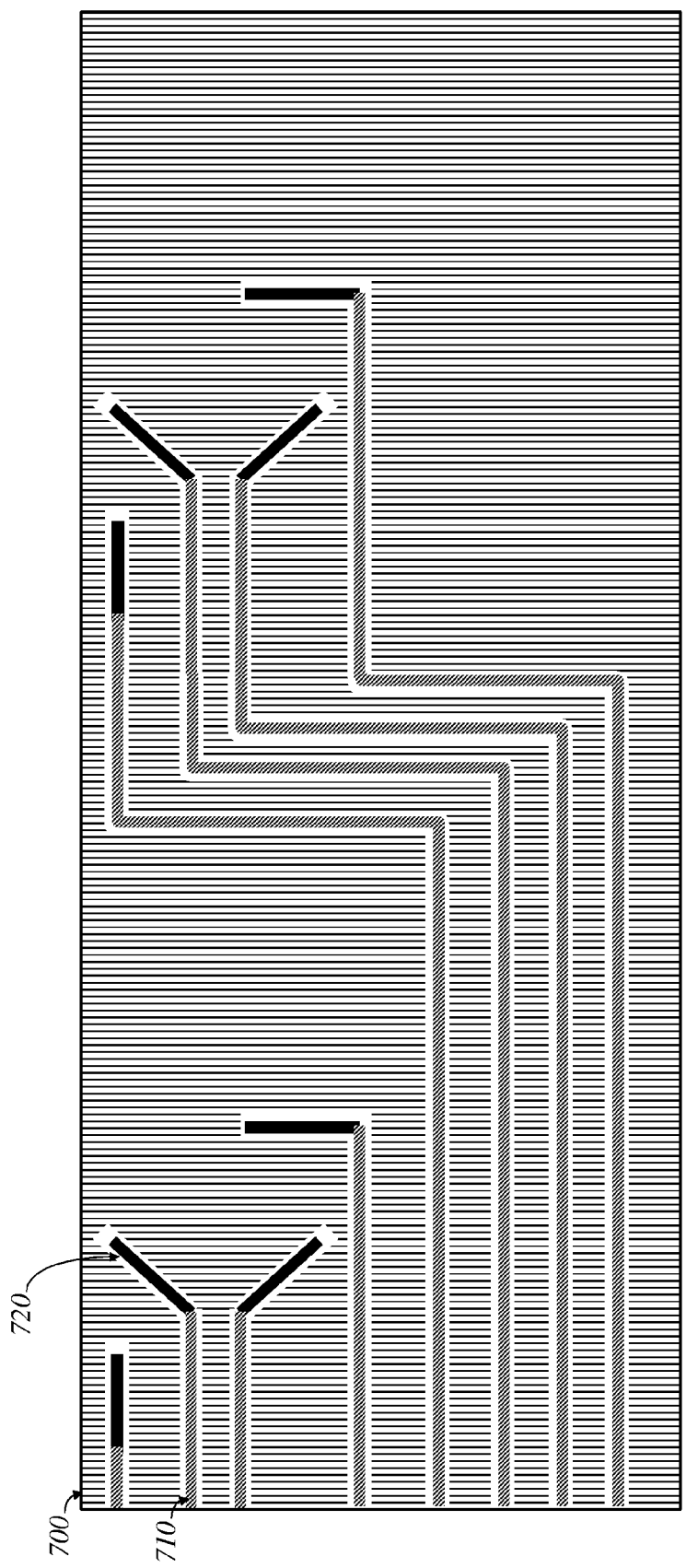
FIG. 7 is a diagram of an embodiment of the invention, showing repeating patterns of antennas on the antenna strip, with multiple transmission lines.

In further embodiments, multiple antenna sets are placed on the same strip, in different locations. A simple embodiment is shown in FIG. 7. In this embodiment, the radiating pattern is repeated at least once down the strip. Each antenna 720 maintains its own lane 710 back to the head of the strip amidst surrounding shielding 700. Not shown in this and the following diagrams are the holes in the other shielding layers, but it is clear from the previous description that there will be holes in many embodiments over at least the radiating part of the antennas so that signal can escape in one or both normal directions to the plane, and as before, the shielding around the radiating antennas on the same layer can differ. In this figure, the lanes for the second antenna set are shown on the same layer as the first. In other embodiments, the antenna lanes are distributed among different layers, all with appropriate shielding between them (one specific embodiment is to zigzag the lanes vertically between each layer so that a lane on one layer is surrounded by the shielding between lanes in the layers above and below): layers then can connect to a higher radiating layer with antennas exposed to the outside world by vias.

Figure 8:
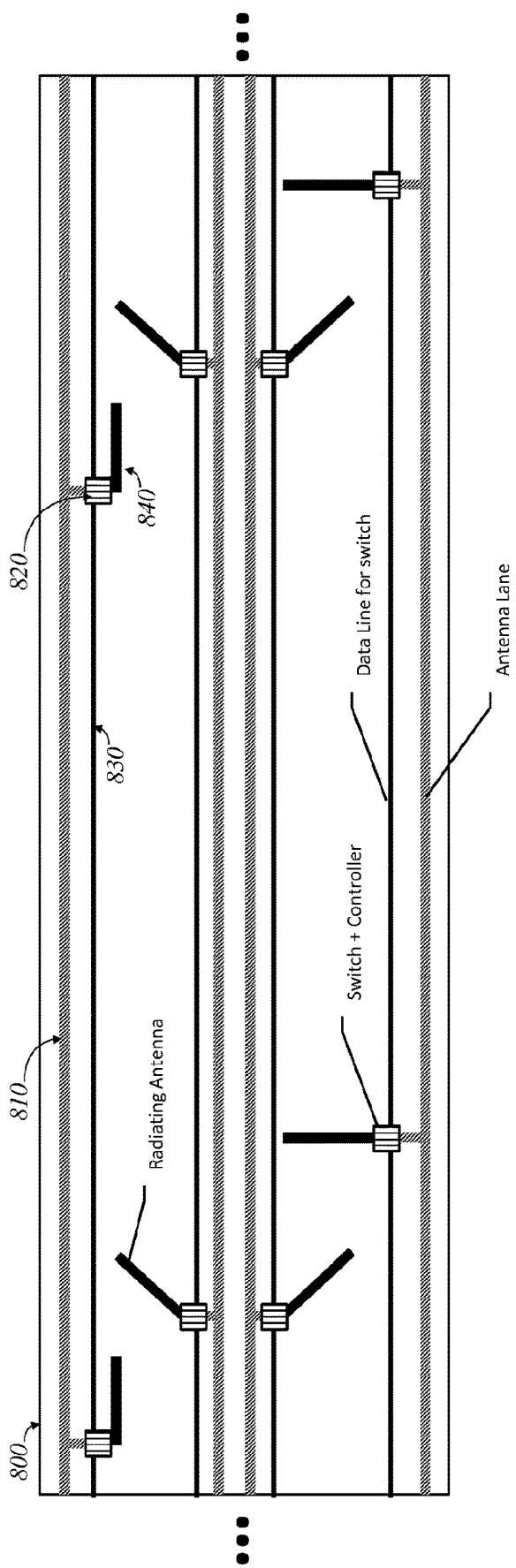
FIG. 8 is a diagram of an embodiment of the invention, showing common antenna transmission lanes and data lines for selectable antenna switches that select among those antennas.

FIG. 8 shows further embodiments that use switched antennas. In these embodiments, the antennas 840 produce sets that repeat along the strip, as many as needed, with one lane 810 dedicated to each antenna. Mounted to the strip are active switches 820. Not shown in this figure is the power lane and ground return for the active switches, as those are obviously routable to anyone skilled in the art. Shown, however, is a data line 830 for the switches. In some embodiments this is a serial line which communicates to an antenna switch/controller 820 that it is that switch that is to be activated. One embodiment has a dedicated switch control line to each switch. Another embodiment uses a simple pulse code to chain the switch/controllers: near the Wi-Fi transceiver is the master controller for the data line, which emits a series of square pulses of a specific address length, followed by a trailer pulse of different length. Each switch/controller electrically terminates the line in that embodiment, and counts the pulses coming in, not emitting the first pulse but emitting the second and further pulses downstream to the next switch, including the trailer pulse. Should only one pulse come in before the trailer, the switch closes and connects its antenna to the antenna lane; otherwise, the switch opens, and the antenna is disconnected. In this way, the master controller emits the number of pulses equal to the count of the switch it wants to activate, starting from one, followed by a trailer. Sending six count pulses and one trailer, for example, will open all the switches on the strip besides the sixth switch as counted from the head end. Clearly, other codes can be used, including binary addressable codes using a variety of different coding, including variable pulse width, Manchester, and others known to the art. The specific embodiment just described is merely a simple code that can be implemented with minimal circuitry. Note that the shielding is not shown in the figure, for clarity of the figure, as how to place the shielding has been described already. For interplane shielding, since now there are mounted components, some embodiments leave holes in the shielding layer for the solder pads of the active components on the layers below. Others remove the antenna lanes to different layers below the top mounting layer and bring the lanes up through vias to the surface layer: one specific embodiment places the vias at the solder pad of the switches, thus preventing accidental leakage by allowing the switch to directly block radiation with its own body. A further embodiment uses the top shielding layer, directly underneath the top mounting and radiating layer, as the ground layer for the active components, and either connects ground occasionally through vias to its own ground line printed on the top layer or always grounds to the second layer through vias.

Figure 9:
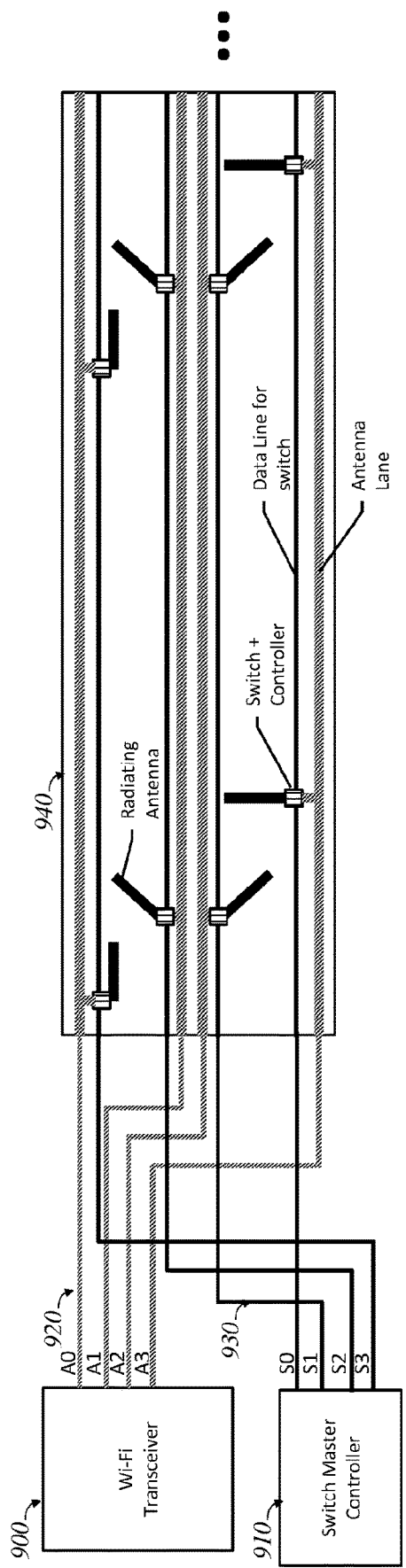
FIG. 9 is a diagram of an embodiment of the invention, showing a wireless transceiver and switch controller driving selectable antenna switches on an antenna strip.

FIG. 9 further illustrates a master controller 910 with switch lines 930 such as those designated S0-4 (or however many are desired) and a Wi-Fi Transceiver 900 with antenna lines 920 such as those designated A0-4 (or similarly desired), connected to a strip or similar structure 940. Other embodiments use different antenna counts, of course, and the patterns and distance of antenna repeat are manufacturing options. The grounding/shielding and power connections are not shown as they are obvious. Note, again, that other embodiments use multiantenna switches, which switch multiple antenna lanes off the same control line. Some embodiments use one switch controller per antenna set but driving multiple single-antenna switches from the one switch line coming from the controller.

Antenna strips do have power losses from the beginning to the end, of course, and as they are analog processes, they require the transceiver to do some work. In some embodiments, a bidirectional amplifier attached between the transceiver and the strip, or placed at one or more points along the strip, counters that. In one embodiment, the amplifiers are at the head end of the strip. In another, they are at one or more places along the lanes, thus splitting lanes at their points of insertion. In another, they are mounted between the lane and the switches, one per switch, thus not splitting the lane. Other locations are possible as well.

Figure 10:
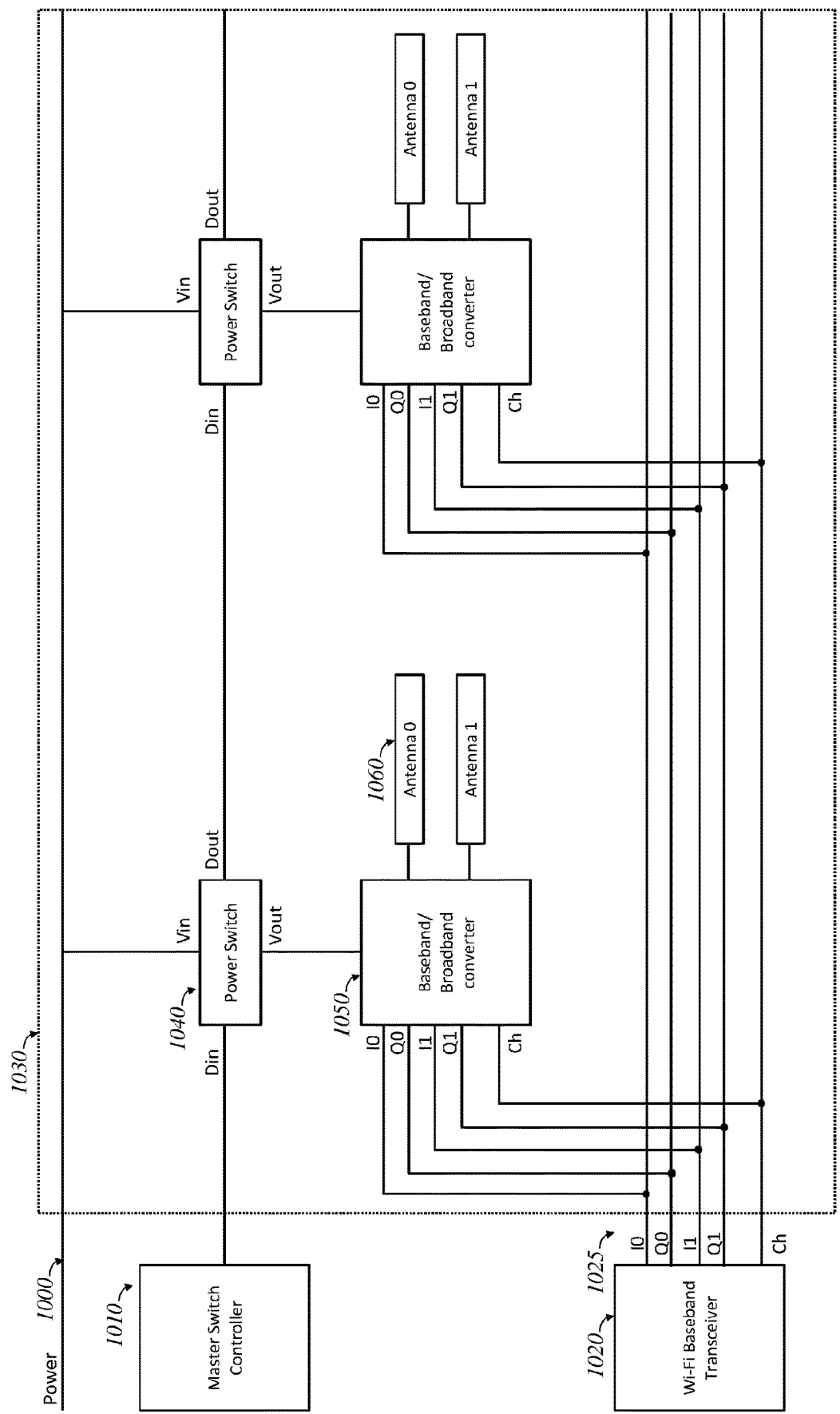
FIG. 10 is a diagram of an embodiment of the invention, showing a wireless baseband transceiver and switch controller driving multiple selectable baseband-to-broadband modulators with multiple antennas, such as on a strip.

However, for exceedingly long runs, or where radiative concerns become paramount, or for cost or installation ease reasons, there are other options. FIG. 10 shows the embodiments using a baseband antenna strip 1030, illustrated in schematic form for clarity, as how to construct strips has already been disclosed. A Wi-Fi Transceiver from previously, which is RF, has now been reduced to a baseband transceiver 1020. Instead of an RF antenna line, there is at least one pair 1025 of baseband analog lines, I and Q, for the real and complex parts of the ultimate broadband signal. At least one bidirectional Baseband/Broadband Converter 1050 (two repeating units are shown in the figure) modulates and upconverts the baseband to broadband on transmission, and down converts the broadband to baseband on reception. The Ch line or lines specifies the channel and transmission characteristics. In some embodiments, the Ch line is one line only, carrying the channel carrier signal, and the converters detect transmission and reception according to the state of the IQ lines. In other embodiments, the Ch line carries a signal describing the channel to be used, and the converters have the resonators inside them and produce the necessary frequency: the channel describing signal in a specific embodiment consists of a lower frequency signal such as that driven by a crystal, as well as a multiplier signal specifying the relative frequency to generate from the crystal line. In other embodiments, the Ch line also carries the Tx/Rx line, and the converters do not sense the IQ lines to determine whether to transmit or receive but instead use the Tx/Rx line (driven usually by the MAC through the transceiver). As shown in the figure, some embodiments choose which antenna set to use by choosing which converter to drive. In some embodiments, the converter is not powered up unless switched on, using a controlled switch such as the previously described antenna switches using a serial line, but instead using a power switch on the power line. In other embodiments, the converters have an Enable line, driven by controllers such as the serial controllers as previously used for switches. One possible advantage of these embodiments is that the baseband signal carries further with less error, and the converters, being sufficiently small and inexpensive, can be mounted in a nearly disposable manner on the antenna strip.

Further embodiments may be described, using instead of using a full baseband converter, a lower-frequency real signal carried on a channel and an additional stage of conversion. This two-stage converter requires that the IQ lines be replaced with lower passband lines, usually one rather than two per antenna, but set at a low, non-radiating frequency sufficiently high enough to allow the signal to be entirely expressed as real voltages. The setup looks very similar to the previous figure. One possible advantage of using an intermediate passband is that the number of lines and the complexity of the converters can be reduced.

Figure 11:
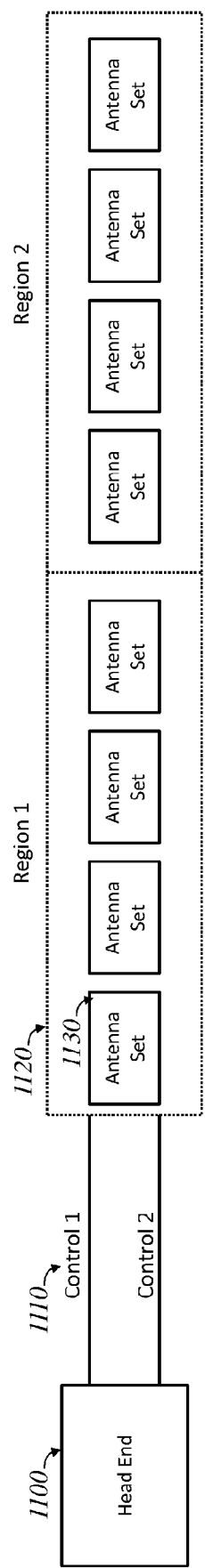
FIG. 11 is a diagram of an embodiment of the invention, showing a head end controlling multiple regions of multiple antenna sets on a strip.

In all cases, it is possible to mount multiple control lines and antenna lanes within a strip (be it antenna strips as disclosed above or transceiver strips below), and thus produce embodiments with strips that can transmit or receive on two or more antenna sets simultaneously. FIG. 11 shows a multi-region strip 1120. In some embodiments, the regions are contiguous, and the strip repeats new regions at intervals.

In some embodiments, one antenna set 130 per region is available to be used by counting, so that if there are five regions, and five command lines, the first command line picks and controls which one antenna set in the first region is used, etc. In other embodiments, the regions are one-of-n, meaning that within a certain repeating region interval the first antenna set belongs to the first choice set, the second to the second, and so on, such that the first control line chooses which region's first antenna set will be used, etc. (Notice that some of these embodiments are an interleaved form of contiguous previous embodiments.)

In many cases, the antenna strips will be enough. However, in some cases, the analog loss will remain unacceptable, and a purely digital transmission mechanism is required to extend the length further. The good news is that full Wi-Fi SoCs themselves are cheap enough that multiple of them can be mounted on a strip.

Figure 12:
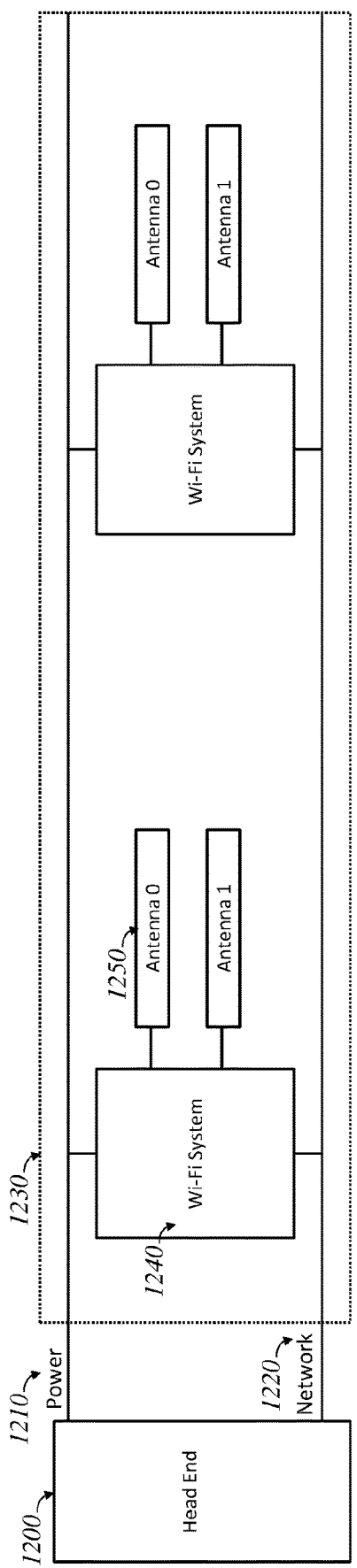
FIG. 12 is a diagram of an embodiment of the invention, showing a head end providing power and networking to a strip with repeated wireless systems.

FIG. 12 shows a transceiver strip 1230. At minimum, a Wi-Fi System 1240 contains a digital to analog transceiver. In some embodiments, however, the Wi-Fi System contains an entire system-on-a-chip. In these embodiments, the network lines connect the systems together. In some embodiments, the network line is a high-speed bus. In some embodiments, the network line is a tappable network, such as a hubbable or modified point-to-point Ethernet. In some embodiments, the network line functions as an addressable backplane. In others, it is a broadcast medium. In some embodiments, the head end 1200 provides networking 1220 and power 1210 for this strip. One possible advantage of these transceiver embodiments is that, limited by power and bandwidth, multiple systems can communicate simultaneously, on the same or different channels. In this way, these strips may be allowed to act very much to the installer the way inexpensive LED strips do: measure out as much as you need, route it where you want, and cut it if desirable. The system is then able to determine how much of the strip to use and when and where to use it, as disclosed below.

Figure 13:
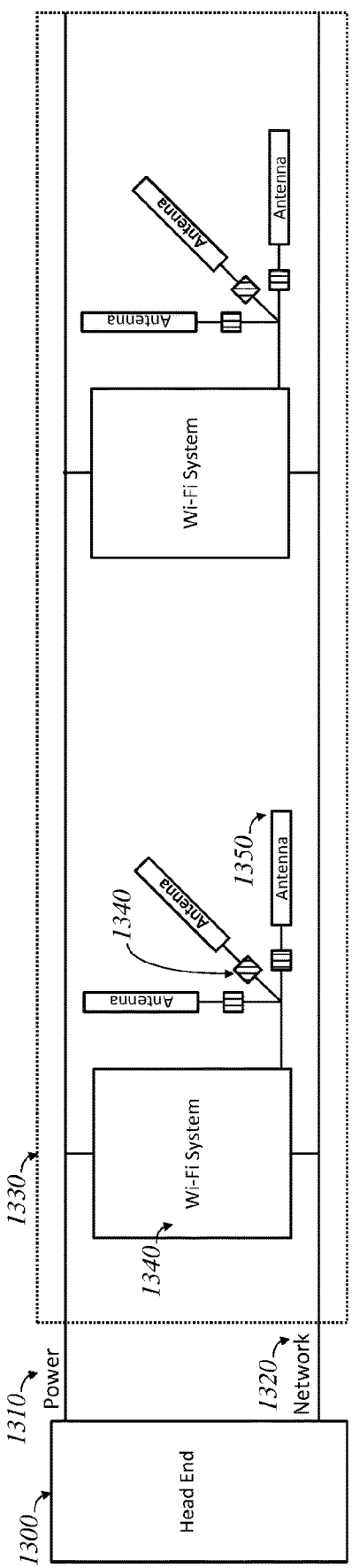
FIG. 13 is a diagram of an embodiment of the invention, showing a head end providing power and networking to a strip with repeated wireless systems, which each drive repeated selectable antennas.
Figure 14:
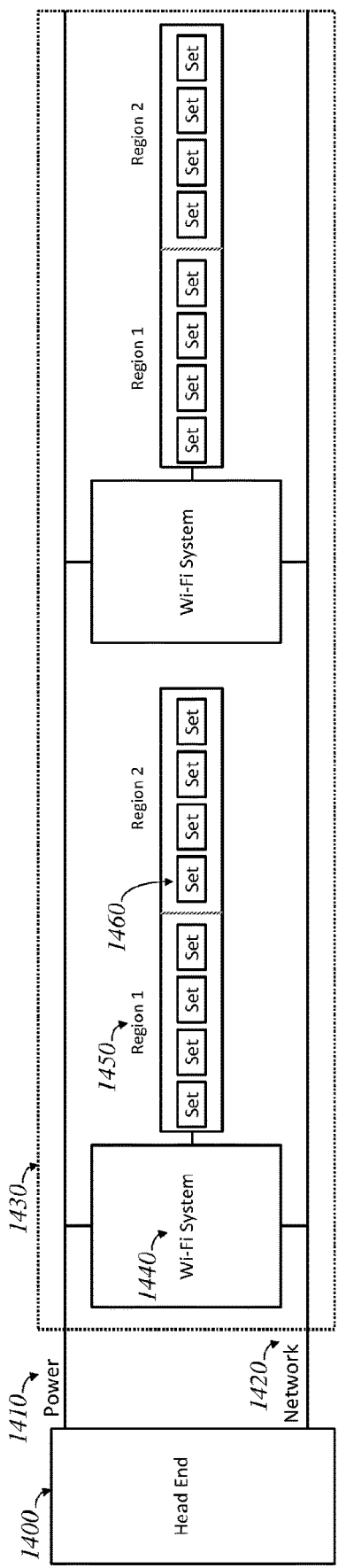
FIG. 14 is a diagram of an embodiment of the invention, showing the composition of multiple selectable antenna sets of an antenna strip embedded with repeating wireless systems on said strip and driven by a head end.

Because the strips provide multiple possibilities, the previous embodiments of having multiple antenna patterns per the lightbulb form factor can be used directly on the strip, such as shown in FIG. 13. For clarity, only one antenna lane and its switchable choices are shown, but the combination is generic and can extend to multiple lanes and choices. The switches 1340 and antennas 1350 may be operated in the same manner as those of FIG. 4. FIG. 14 shows an embodiment with a generic combination, where the strip 1430 is divided into repeating meta regions, containing a Wi-Fi System 1440 acting as its own controller and head end of subregions 1450 (two are shown, any number are possible), each containing antenna sets 1460 (four are shown, any number are possible), where the antenna sets may comprise any of the disclosed embodiments including passive multiple antenna lanes, actively switched lanes, converted lanes, and so on.

The strips so far have been described as flat, two-dimensional objects. However, because the antennas may need to be in three dimensions, some embodiments also are three dimensional. In some embodiments, the antenna sets are mounted on daughter strips. In some embodiments, the antennas are stiff wire soldered or connected in the correct place. In some embodiments, the strip itself is crimped, folded, or turned at intervals to allow it to cover different orientations before returning to its original orientation. In some embodiments, the strip has at repeating intervals a mechanical connector, such as a rotatable connector (among which are freely with brush rings or constrained by a cable) or foldable or flexible bridge, to allow for altering the orientation at installation time. In some embodiments, the antennas are motorized, as previously disclosed. Some embodiments mix and match, having some parts be flat and other parts have these options, per manufacturing specifications.

Strips may have an efficient form factor. However, the techniques of interconnection that have been disclosed on a strip can be done outside of a strip. Therefore, other embodiments use the above disclosed structures, but separate the circuits using wires or cables. For example, some such embodiments are to have the antenna sets each mounted on its own circuit board (flexible or not), connected by cables containing the same structure. Other embodiments merely separate the repeating units into separate strips or circuits, connected by cables. This may be created on the field, the same way that LCD strips may be cut and cabled on the field (including using solderless contact closure cables), or they may be produced this way in manufacturing. The cables may have plugs in them to allow field reassembly of a string as long as desired, or they may not.

Because cabled strings have a useful form factor, a further set of embodiments are directed towards driving a string from a limited power budget, such as from one or more Power-over-Ethernet (PoE) drops.

The lightbulb and strip embodiments converge for a specific set of embodiments. Long tube bulbs may require more than one antenna set, and thus in some embodiments the tubes include two or more antenna sets, as installed as strips or by wires. Further embodiments allow for the strips to, not surprisingly, also have lighting integrated and operate as LED strips as well.

Note that the number of antennas, the length of the strips, and the layout and spacing of antenna sets and repeating units or regions on the strips are manufacturing options and are not limited per the figures or descriptions.

Existing buildings, and new ones by default, are often populated with PoE cables for the rooms. These PoE cables are drawn today for traditional Wi-Fi deployments, where it is expected that one access point will be connected to the PoE port, and thus will receive its networking and power. PoE, unlike traditional AC power, is severely wattage limited, and thus it is highly unlikely that a strip containing, say, 20 active Wi-Fi transmitters at full power can be powered from one PoE port. Besides power, other resources, including over the air interference, network bandwidth, and even radiated power human exposure concerns, can lead to a need to dynamically budget.

Figure 15:
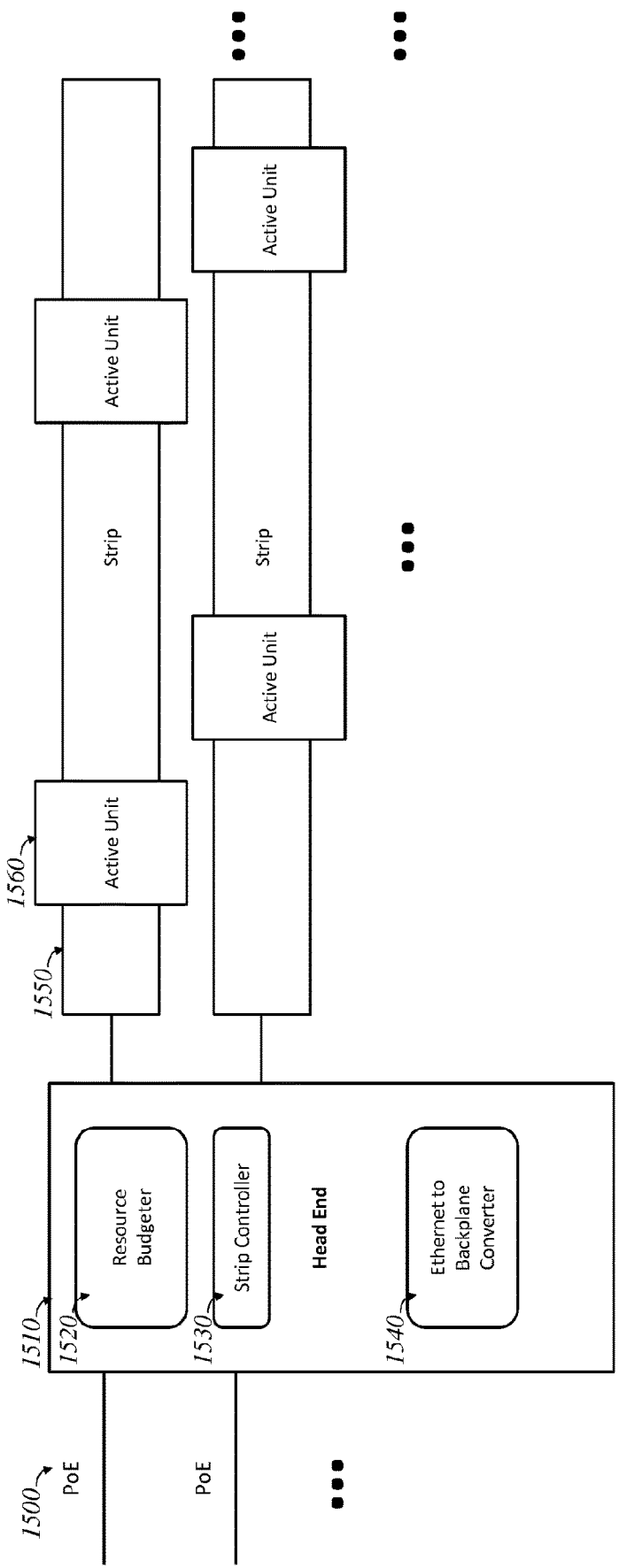
FIG. 15 is a diagram of an embodiment of the invention, showing resource allocation driven by the headend into selecting active units from the totality of units on one or more strips.

Some embodiments address the need to fit within a power budget by limiting the number of activated circuit components. (Without loss of generality for other resource constraints, we may use "power" below to stand in for the generic resource.) FIG. 15 illustrates some embodiments that perform resource budgeting. For one or more strips 1530 (or strings if cabled) with multiple Wi-Fi Systems containing complete systems on a chip, a resource budgeter 1520 can request for the SoC to power down into a power saving state. Some embodiments allow for the SoC to wake back up using Wake-on-LAN on its wired network. Some embodiments use specific addressable power controller switches to control the SoC power directly. The resource budgeter can request for multiple transceiver sets to turn down or off individual transceivers, as well.

In some embodiments, the resource budgeter can measure the available power dynamically; in others, it is manual. In some embodiments, the resource budgeter can measure the length and contents of the string or strip, such as using a discovery protocol (digital, broadcast, or using keyed passive components such as resisters or capacitors at different values corresponding to different cut points on the string's length. (Picture a 100 kiloohm resister bridging in each cuttable region across two lanes of the strip, so that cutting the strip so that it contains five regions would have five 100 kΩ resisters in parallel for 20 kΩ total.) The resource budgeter in some embodiments is in the head end 1510. In others, it is in the repeating units of the strip or string.

Note that one or more PoE ports may be bonded to increase the power available. Below is shown some embodiments of a resource managed PoE strip set.

Figure 16:
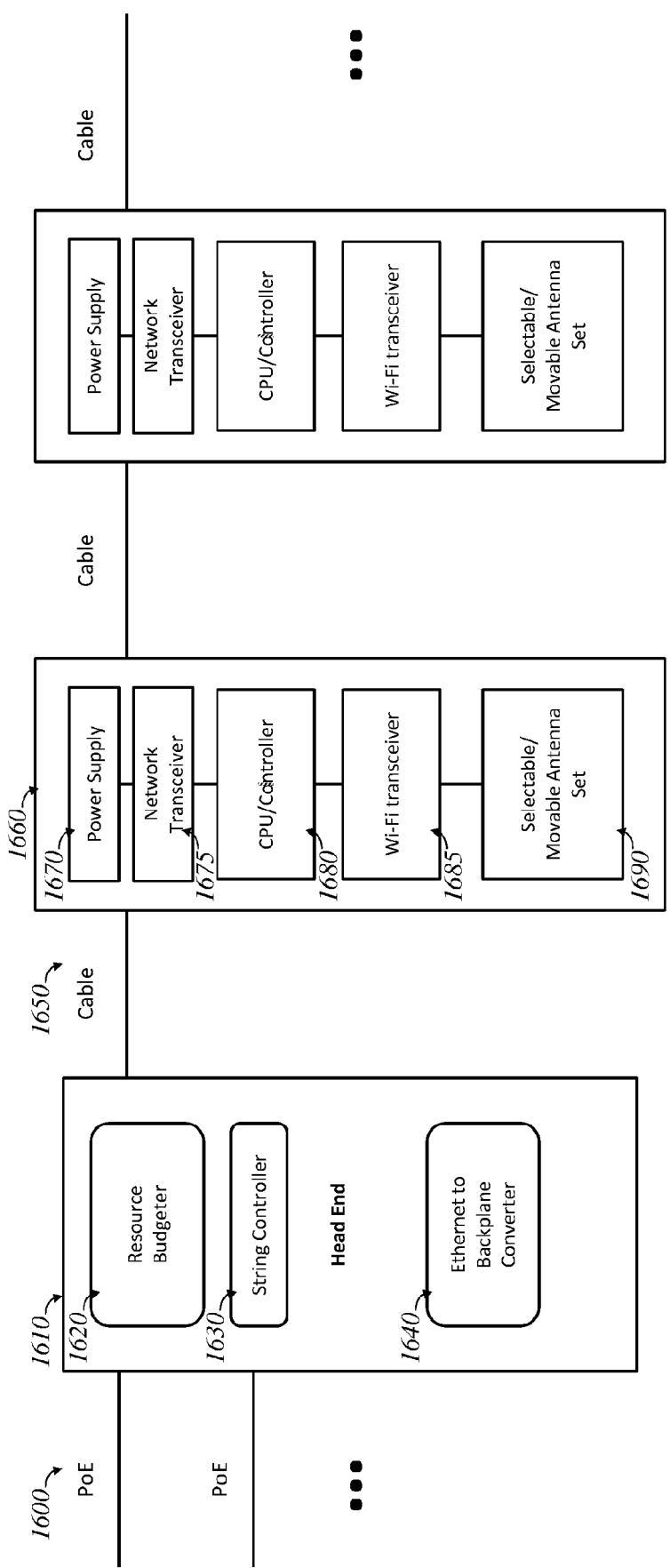
FIG. 16 is a diagram of an embodiment of the invention, showing a head end driving over cable, as opposed to a strip, multiple wireless systems.

FIG. 16 shows a similar embodiment to the prior figure, but as a string, with wires or cables 1650 connecting individual units 1660 together, back to a head end 1610 driven by one or more PoE lines 1600. In this embodiment, one may think of the entire unit as being like an inexpensive Christmas light string, except that the service being provided is wireless. And, as before, other embodiments replace the PoE with other networking and power options. Some embodiments use AC power to power the head end, as an option or as the only option, and connect to the network through other means, such as Ethernet ports. This is a small modification of using PoE to power, by allowing local power sources. Because the string may be long, providing power locally may be more convenient than in traditional PoE applications for wireless. As before, the cables may be wired permanently or pluggable. Some embodiments use only powerline and replace the PoE with powerline and a powerline transceiver for the head end. Some further embodiments then deliver low power and a separate network line to each of the units on the string. Other further embodiments retain AC power down the line but have a separate wired network in the cable. Other further units use powerline networking and power technology throughout the string.

Figure 17:
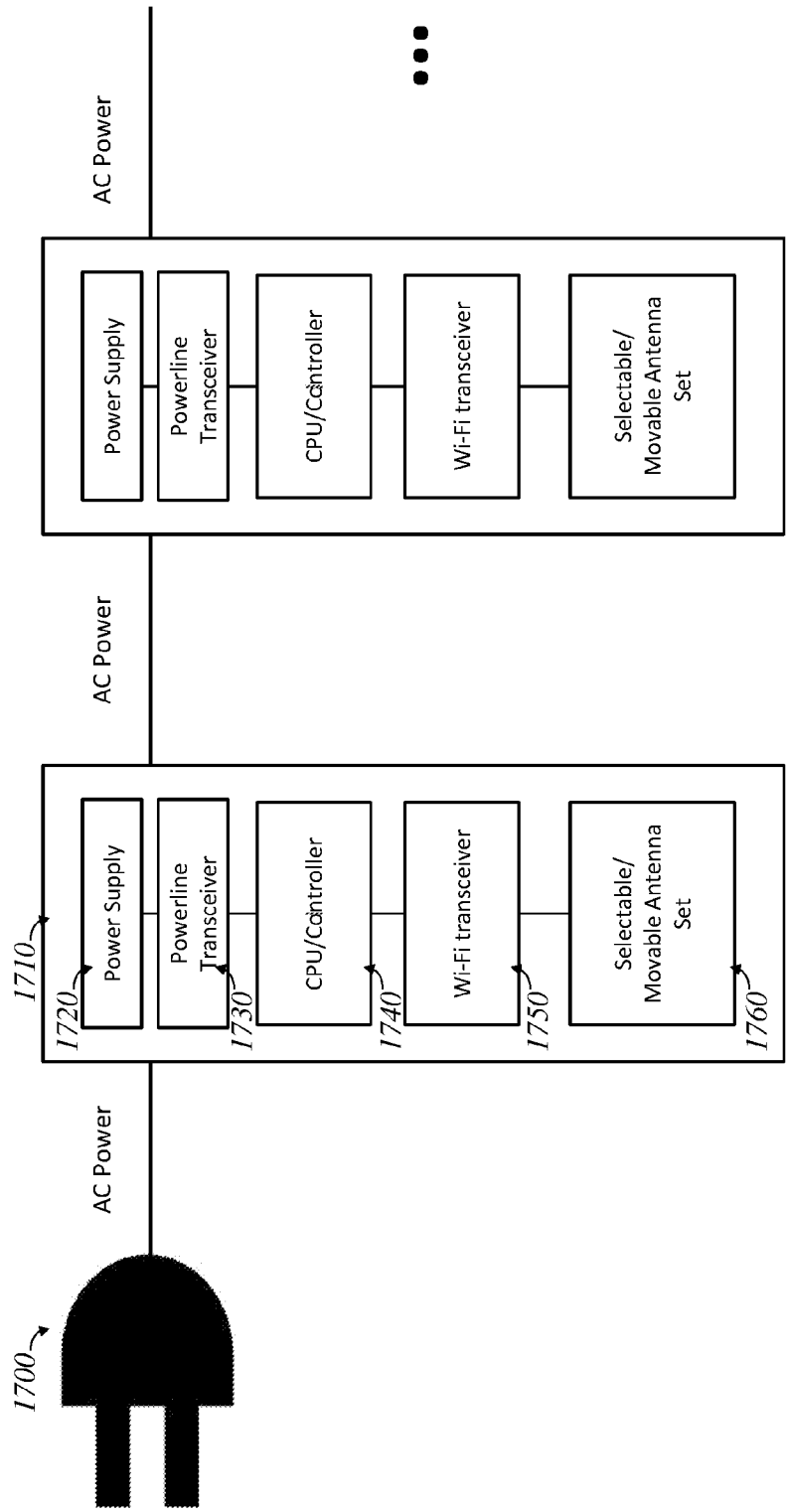
FIG. 17 is a diagram of an embodiment of the invention, showing repeated wireless systems driven in a string using AC power.

FIG. 17 shows embodiments which dispense with the head end completely and use powerline to drive the individual units on the string or strip, by introducing local power supplies 1720 into the individual units 1710. Some embodiments further use powerline transceivers 1730 to access wireline networking using the same power. Some embodiments relocate resource budgeting to one or more individual units of the string, such as the first unit; others relocate resource budgeting off string, such as to a different unit or different head end, or to a server, appliance, or cloud; others dispense with it completely. In these embodiments, each unit has a powerline transceiver to communicate over the AC power. Some embodiments use junction box wiring instead of a plug.

Once a building is full of lightbulbs or strips of possibly densely overprovisioned Wi-Fi (or other protocol, such as Bluetooth or 4G/5G), the issue of control arises. It makes no sense to power up each radio fully into transmitting: doing so would make the problem of interference much worse. However, having the flexibility to choose which radios among the entire set allows the embodiments to approximate the ever-shifting optimal location using the rich array of deployed options for locations. This approximation can arbitrarily approach the total optimality of having radios that can be driven to the correct locations on some sort of mobile platform (a robot, say).

Figure 18:
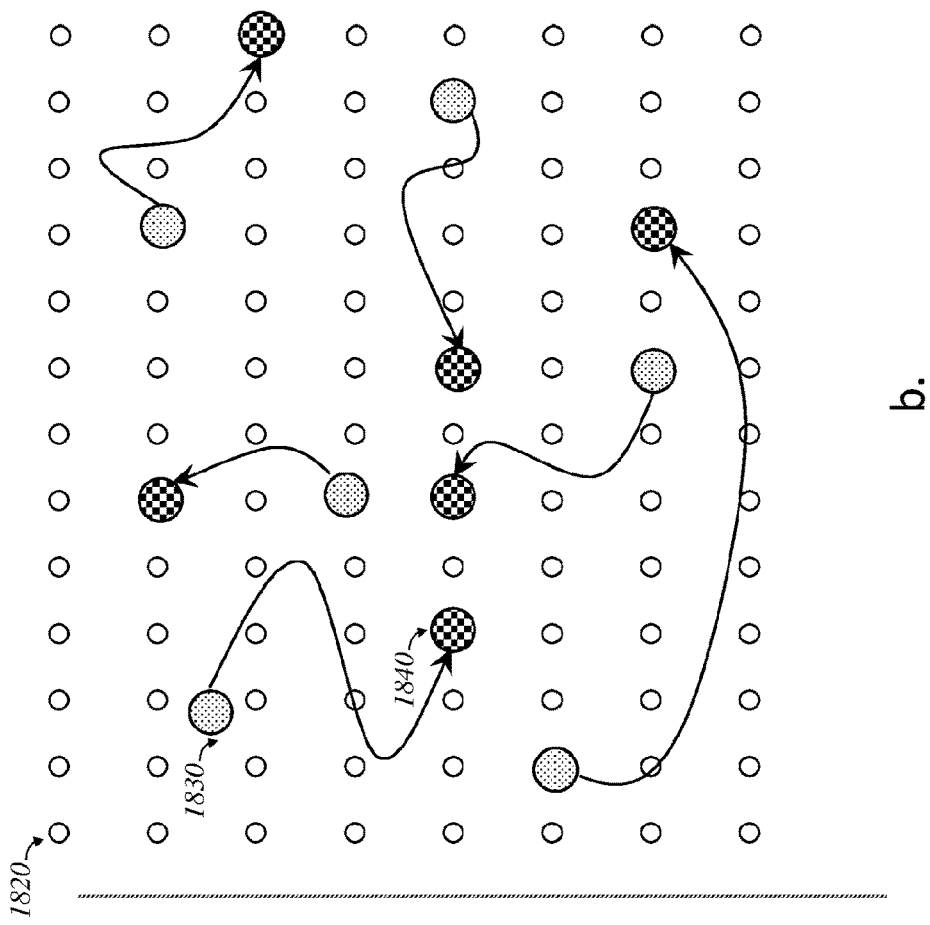
FIG. 18 illustrates a possible benefit of an embodiment of the invention, wherein access point transmission locations are set electronically to points amidst a higher density of selectable locations, thus possibly more closely emulating the situation of if the access points could be physically relocated to their optimal locations from their current ones.
Figure 18:
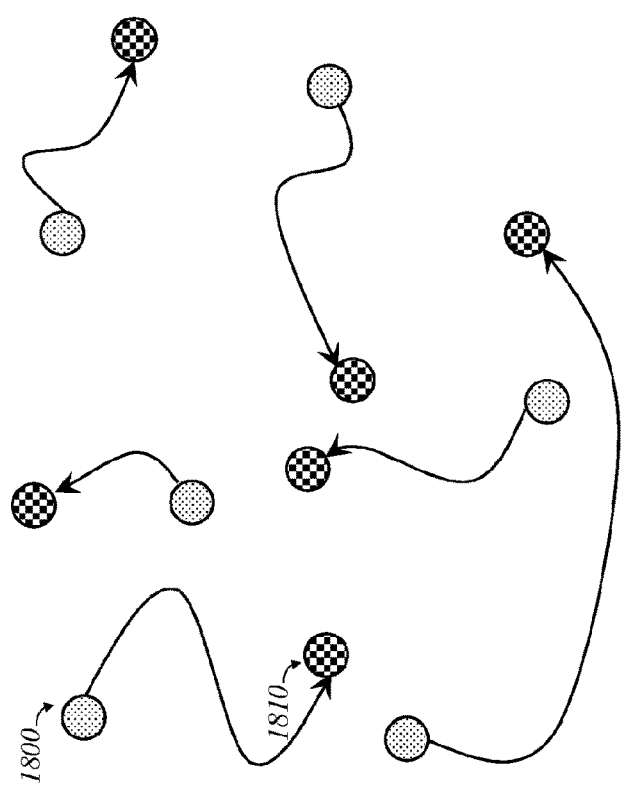

FIG. 18 compares the ideal circumstance of base stations 1800 and 1830 being physically moved to the optimal locations 1810 and 1840 in reaction to the changing network needs in part a, versus in part b the approximation to that gained by the densely deployed resources, most of which are disabled (small empty circles 1820), but some of which are powered on and operated as needed. Without the ability to control this and create reasonable approximations to optimal or rationally deployed resources, dense deployment of any form will lead to failure, which is one reason why existing Wi-Fi lightbulb manufacturers haven't bothered to turn their bulbs into access points and enter the Wi-Fi infrastructure business. (Another reason, as mentioned before, is that until this invention doing so was extraordinarily cost prohibitive and not installable.)

Figure 19:
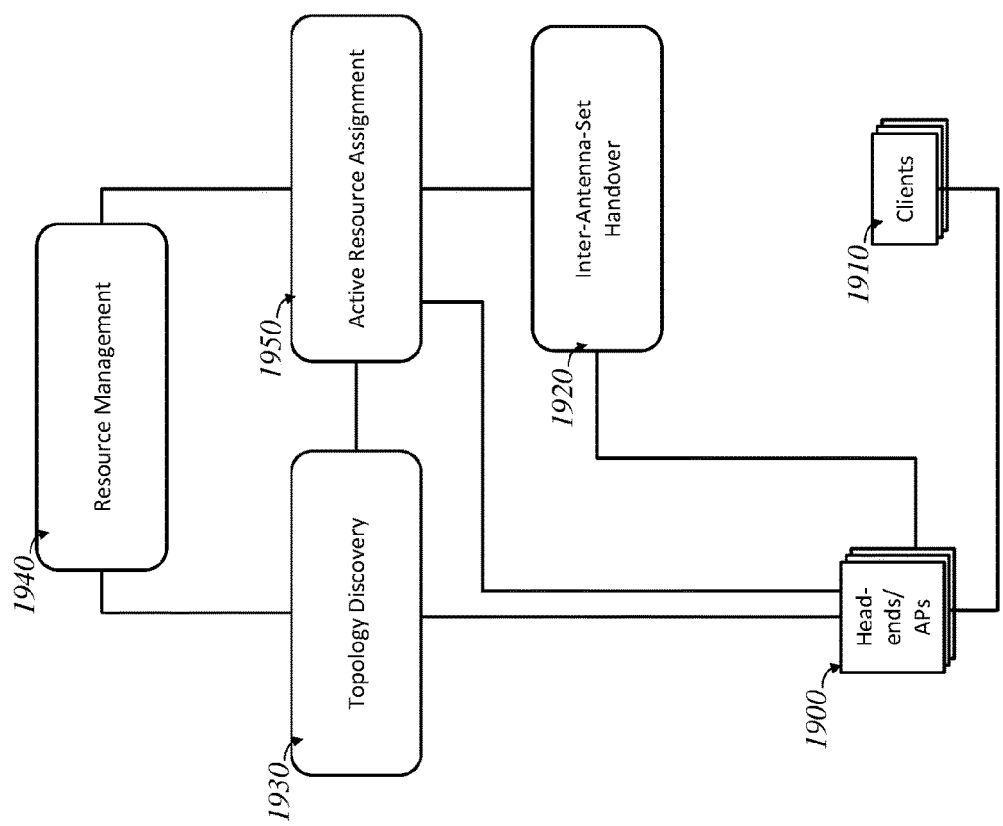
FIG. 19 illustrates a diagram of an embodiment of the invention, showing resource management and topology discovery across multiple head ends or discrete access points.

FIG. 19 lays out the basics of dense or over deployment resource management. Radio resource management today is limited to mostly standard deployments. In a minor case of over deployment, it can power down some APs, and in some cases suggest or automatically turn a few egregious ones off. But these are designed for deployments where the excess resources that need to be cut off are far less than the number that are active, whereas what is disclosed here is for the case where the excess resources, like in FIG. 18*b*, far outnumber the active resources. That scale is key. When properly deployed, a densely deployed network on a typical enterprise campus will have radio resources at numbers greater than 10,000, and in some cases approaching densities of one antenna set per square yard or more in the areas of physical deployment. Existing radio resource management techniques have not been built, at any point, for that sort of density or scale, which is why they are limited to operating on expensive, lovingly installed access points.

The location of the Overdeployment Resource Manager is flexible. In some embodiments, the manager is software located in a controller appliance. In other embodiments, it exists in one or more locations as software, such as on servers, desktops, or in head ends or CPUs located elsewhere within the invention. In some embodiments, it runs in the cloud. The resource manager in some embodiments exists as only one entity; in others, they coordinate.

A topology discoverer 1930 oversees understanding just where all the resources ended up. This can be measured in radio space (measured by the signal attenuation between two measurable objects), physical space (measured by location, such as GPS or BLE), or combinations of the two. Since, unlike with a traditional Wi-Fi network the resources may so greatly over deployed, topology discovery becomes quite simple, as a high number of other resources are in range of any one given resource in many cases. Some care is needed, however, in measuring the topology. In power or resource constrained systems, it may not be possible to power up each antenna set at once. However, a bootstrapping mechanism is available. One such mechanism is to turn on a subset (such as a maximum subset available based on resource constraints) of the resources and record the topology, then turn off some smaller subset of resources and turn on another subset that was not yet turned on, and integrate the two subsets together. If the topology is maintained in graph form, this is trivially done. If the topology is also laid out in some metric space, then a best fitting will usually need to be done as there is statistical noise in the measurements usually and some conformation will usually have to be found. The nature of the topology measurements often allows for them to be done on an operating environment: usually, the enabled resources will be less than the maximum resource budgeted, but even if not, existing resources can use protocol methods (such as requesting a silent period to go "off channel" as in 802.11k) to power down and allow another resource to turn on. Note that a resource is as granular as an antenna: this allows for the system to cycle through or search through antenna patterns as well as transmitters, full radios, and full access points. Part of the topology should include the distribution of users and their wireless clients.

Once the topology is known, a resource manager 1940 can evaluate the dynamic network utilization and demands and determine what the new best distribution of resources should be. Some embodiments consider TCP load. Others consider application specific knowledge, such as tracked application state. This can be very useful for streaming applications, where the video stream can be anticipated from its exchanges. Other embodiments use past statistical history. Other embodiments use specific resource requests. Some embodiments consider minimizing service disruption, or at least weigh the cost of service disruption to existing clients as it also evaluations service disruption to new loads that cannot be adequately served by the existing configuration. Once the resource manager 1940 has determined what changes it wishes to make, it conveys them to an active resource assignment storage 1950, which remembers what was requested. If the resource changes are nondisruptive, such as a local antenna pattern change, those requests are conveyed directly to the head ends of the strips and the other APs to execute. If the changes are across some distance, however, then more work will be done. An inter-antenna set handover manager 1920 is responsible for determining how to execute the reconfiguration across that distance.

The distance problem is important. We want to move an AP, in the view of the clients. That may put some of them out of range. In some cases, this is an acceptable risk, and the handover manager 1920 will decide to do nothing about that and execute the move. In some cases, multiple clients will get stranded, and the block will then request clients to relocate. In some embodiments, this occurs by disassociating the client. In some embodiments, the clients' access point requests a load balancing or handoff protocol exchange (such as that in 802.11k/802.11r) to cause the clients to want to leave their current access point (and likely channel). To the extent that the topology shows good suggestions on where to go, these protocol requests can include those suggestions or demands, based on the protocol.

One of the techniques is to preserve the BSSID of the clients as the antenna set is changed. If the old and new antenna sets belong to the same medium access controller, this is trivial. However, if the old and new antenna sets belong to different MACs, the handover must request the old MAC (and probably thus the old AP) to power down, and for the new one to power up. Some embodiments power up the new one first, subject to resource budgets such as power. Once the new one is up, the handover block hands over enough access point state to allow for seamless operation. This can include security tokens and counters, client state machines, application tracking state, and so on. In some embodiments, this state is streamed from the old access point to the new access point, until the access point confirms that it has the state established and is ready to listen on its radio and begin transmission. In some embodiments, both the old and new radios are powered, and the new radio is merely waiting on the new MAC to begin caring: this may be done at the MAC level or through tricks such as setting the BSSID mask to invalid or useless values so that the set does not respond. Once the handover is ready, then the old and new APs agree to the handover and execute it in as atomic a method as reasonable. In some embodiments, they agree to a specific cutover time. In other embodiments, one of them waits for a message from the other (over the air or over the back network). In some embodiments, the handovers can only properly occur within a head unit; in others, it can occur between any two MACs and their APs. Note that the client will not see a handover and will experience the AP magically jumping from one location to the other, even though in reality the transition happened between two APs. This is because we are assigning a smaller set of BSSIDs to a much larger set of APs, thus breaking the traditional one-AP-per-BSSID mapping. This is entirely within the standard, as such a transition appears as merely a physical relocation or a failover event. Care must be taken not to violate the expectations of the client without fair warning, such as transitioning radio capabilities that are not properly advertised and allowed to be changed during an association of a client. The handover block is responsible for taking that care, and if it decides it needs to violate that rule, to assign possible new BSSIDs to prevent client confusion. Channel change does not require BSSID change, because access points routinely change channels in traditional systems.

Many of these embodiments have what may be simpler installations. In many cases, an installer can simply walk to the beginning of a long hall, say, and roll out the strips, perhaps merely resting them on top of ceiling tiles. Strips may also be installed in the visual space, and thus may be painted to match. Temporary installations require merely rolling back up the strips when done. For plug in or lightbulb embodiments, merely screw in enough of these that there is enough density for the room. The density may remove the need to perform a "site survey" or think too deeply about the ramifications of interference or density. So long as enough items are installed, the system may be able to solve for a good resource activation. For strips that do not include the transceiver, it may be possible to even upgrade the radios from one standard to a different one, with different hardware, by merely replacing the head end and leaving the strip in place.

Figure 20:
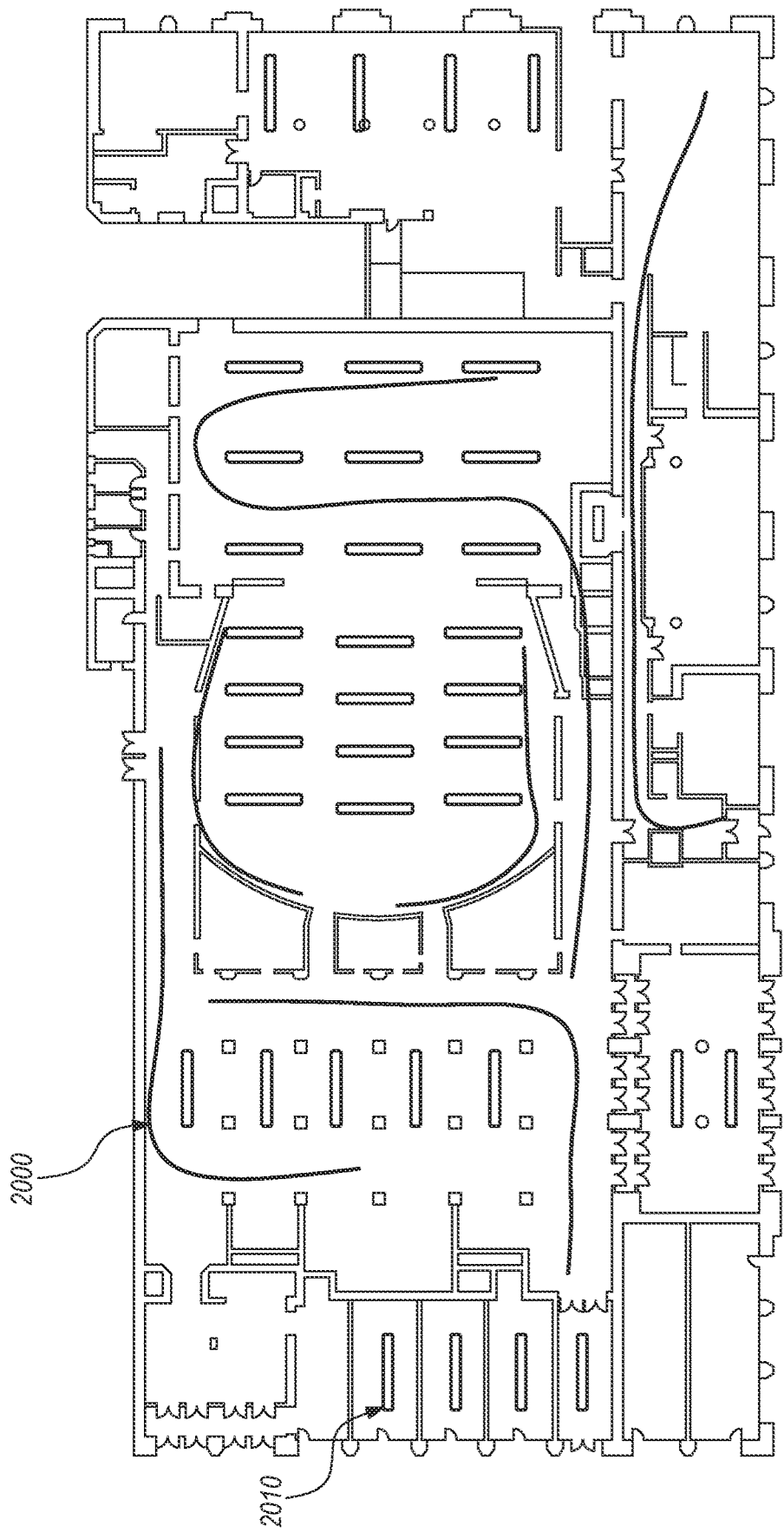
FIG. 20 illustrates a method of installing multiple embodiments of the invention.

FIG. 20 shows an example deployment with both strips and bulbs, on a floorplan, thus illustrating potential advantages of the disclosed invention. The long strings 2000 are strips or strings that have been mounted. The rectangles 2010 are lightbulb embodiments (in this case large tube lights). The strips are mounted with head ends powered by PoE (not shown in the figure), based on convenient drop locations. The bulbs run back through the power main to a powerline network converter which bridges it to the Ethernet backbone (also not shown). In a closet (not shown) is the resource manager, which orchestrates the entire system together.

Throughout this disclosure, the term "Wi-Fi" is used to refer to a specific type of wireless networking, based around the IEEE 802.11 standard. However, the techniques taught within apply broadly to wireless networking, and the use of "Wi-Fi" is not to be taken as a limitation specifically to IEEE 802.11 unless specifically stated or implied by the context. Furthermore, antenna shapes are illustrated for the purposes of connectivity and distinction (such as antennas being drawn at different orientations to represent different antenna patterns). These illustrations are conceptual in nature as to the shape of the antenna elements, including ground planes. Identifying specific antenna shapes, applying impedance matching techniques, ground plane construction, and the like will produce differing shapes in actual construction based on manufacturing choices such as that of material, thickness, conductor weight, and so on, and are all well understood in the art without any speculation or experimentation required.

Furthermore, throughout this disclosure, multiple specific embodiments are listed that may be extensions of more general embodiments. It is to be understood that the combinations and subprocesses of these embodiments are also taught by this disclosure, as the combinations and subprocesses can be anticipated by those skilled in the art upon and only upon reading this disclosure. Furthermore, uses of the plural or the singular do not restrict the number of the item being mentioned: unless explicitly called out as not being so or being logically inconsistent, mentions of singular items are to be construed to also be plural and vice versa.

Furthermore, throughout this disclosure, multiple alternative embodiments are listed. Each embodiment differs in tradeoffs or effects and as such is a best embodiment for that set of tradeoffs and effects. The choice of alternative to use depends on the tradeoffs or effects desired by an implementer skilled in the art, and such choice is obvious and straightforward within the art and requires no further invention or discovery. Conditional language such as "could", "can", and "may" are intended to refer to and are to be construed as referring to options (manufacture, configuration, or based on availability) within embodiments of the invention and do not state that additional invention is required. For example, the statement that "the invention can react to a given input" means that one configuration of one assembly of an embodiment of the present invention does indeed react to that input. This is done for linguistic economy only and does not suggest uncertainty or incompleteness as it relates to the invention being taught or otherwise. This disclosure does not speculate as to the future state of the art; it states a current invention. Examples are provided as explicit embodiments of the invention, as well as to elucidate the teaching.

This disclosure lists enough details to enable those skilled in the art to construct a system around or a technology using the novel methods of the contained inventions, without further discovery or invention.

I claim:

1. A wireless networking system, comprising:
   a head end comprising one or more networking or power inputs, a processor and a memory, an upstream networking-to-backplane converter, and at least one output carrying power and networking;
   at least one wireless deliverable unit connected to the head end and carrying the at least one output along a length thereof;
   three or more Wi-Fi systems on the wireless deliverable unit, the three or more Wi-Fi systems each being coupled topologically in a series to a power and distribution system;
   wherein the at least one wireless deliverable unit comprises an elongated transceiver strip or cable with the three or more Wi-Fi systems being mounted on or within the elongated transceiver strip or cable at different positions along a length of the elongated transceiver strip or cable;
   wherein the elongated transceiver strip or cable is capable of being positioned such that different portions of the length of the elongated transceiver strip or cable extend in different directions within three-dimensional space;
   wherein the memory comprises non-transitory computer-readable instructions which, when executed by the processor, cause the processor to execute determining the topology of the wireless networking system, including the three or more Wi-Fi systems, after deployment of the wireless deliverable unit via:
      selectively turning on one or more resources of the three or more Wi-Fi systems;
      measuring radio signals of the one or resources;
   wherein the topology of the wireless networking system is measured in radio space, physical space, or both.

2. The wireless networking system of claim 1, the memory further comprising computer-readable instructions which, when executed by the processor, cause the head end to request one or more of the three or more Wi-Fi systems to power down to a power saving state or to turn down or off individual transceivers.

3. The wireless networking system of claim 1, each of the three or more Wi-Fi systems comprising a power supply, a network transceiver, a central processing unit, and a Wi-Fi transceiver;
   each particular Wi-Fi system among the three or more Wi-Fi systems being coupled to a set of two or more antennas for that particular Wi-Fi system;
   the set of two or more antennas for each particular Wi-Fi system being a selectable or movable antenna set.

4. The wireless networking system of claim 1, each of the three or more Wi-Fi systems comprising a power supply, a network transceiver, a central processing unit, and a Wi-Fi transceiver;
   each particular Wi-Fi system among the three or more Wi-Fi systems being coupled to an antenna distribution system for that particular Wi-Fi system.

5. A wireless networking system, comprising:
   three or more Wi-Fi systems arranged in a linear row as a single deliverable unit, wherein the single deliverable unit comprises an elongated transceiver strip or cable with the three or more Wi-Fi systems arranged at different positions along a length of the elongated transceiver strip or cable, and wherein the elongated transceiver strip or cable is capable of being positioned such that different portions of the length of the elongated transceiver strip or cable extend in different directions within three-dimensional space;
   a processor and a memory that are communicably coupled to the three or more Wi-Fi systems, the memory comprising non-transitory computer-readable instructions which, when executed by the processor, cause the processor to execute determining a topology of the wireless networking system, including the three or more Wi-Fi systems, after deployment of the single deliverable unit via:
      selectively turning on one or more resources of the three or more Wi-Fi systems;
      recording radio signals associated with the one or more resources;
   wherein the topology of the wireless networking system is measured in radio space, physical space, or both.

6. The wireless networking system of claim 5, further comprising at least one of a single networking line and a single power line, or a combined power and networking distribution, the single networking line and the single power line, or the combined power and networking distribution, being arranged along the linear row and coupled to each of the three or more Wi-Fi systems.

7. The wireless networking system of claim 6, comprising the single networking line and the single power line, further comprising a head end having outputs coupled to at least one of the single power line and the single networking line, each of the three or more Wi-Fi systems being coupled to the at least one of the single power line and the single networking line, wherein the head end comprises the processor and the memory.

8. The wireless networking system of claim 7, the three or more Wi-Fi systems being coupled in series to the single power line and to the single networking line, each particular Wi-Fi system among the three or more Wi-Fi systems being coupled to an antenna distribution system for that particular Wi-Fi system.

9. The wireless networking system of claim 7, the single power line and the single networking line, and the three or more Wi-Fi systems being mounted on or within an elongated transceiver strip.

10. The wireless networking system of claim 7, the single power line, the single networking line, and the three or more Wi-Fi systems being mounted on or within an elongated cable.

11. The wireless networking system of claim 10, further comprising a plurality of circuit boards, each particular Wi-Fi system among the three or more Wi-Fi systems being coupled to an antenna distribution system for that particular Wi-Fi system, each of the antenna distribution systems being connected to a particular circuit board for that set, each of the circuit boards being coupled to at least one cable that couples to one or more of the single power line and the single networking line.

12. The wireless networking system of claim 6, comprising at least the single networking line, and the single networking line comprising any of a high speed bus, shared medium network, daisy-chained or cascaded hubs or switches using one of Ethernet, PCIe, or other SerDes technology, or point-to-point network links between the three or more Wi-Fi systems.

13. The wireless networking system of claim 6, comprising at least the single networking line, and the single networking line functioning as one of an addressable backplane or a broadcast medium.

14. The wireless networking system of claim 6, the single power line and the single networking line, or the combined power and networking distribution, and the three or more Wi-Fi systems, being mounted on or within an elongated transceiver strip.

15. The wireless networking system of claim 14, the elongated transceiver strip comprising an elongated flexible material.

16. The wireless networking system of claim 14, each particular Wi-Fi system being coupled to an active RF switch, the active RF switch being coupled to an antenna distribution system for that particular Wi-Fi system and being configured to selectively connect an output of that particular Wi-Fi system to one particular antenna in the antenna distribution system for that particular Wi-Fi system.

17. The wireless networking system of claim 16, the active RF switch comprising an active, software programmable antenna distribution system.

18. The wireless networking system of claim 14, the elongated transceiver strip comprising a plurality of repeating meta regions, each meta region comprising one of the three or more Wi-Fi systems configured as a controller and second head end of one or more subregions, each of the subregions comprising an antenna distribution system of each particular Wi-Fi system.

19. The wireless networking system of claim 14, wherein an antenna distribution system of each of the three or more Wi-Fi systems is mounted on daughter strips that are attached to the elongated transceiver strip.

20. The wireless networking system of claim 14, the elongated transceiver strip being crimpled, folded, or turned at intervals.

21. The wireless networking system of claim 14, the elongated transceiver strip comprising, at repeating intervals, a plurality of any of a mechanical connector or a flexible bridge for altering an orientation of the elongated transceiver strip.

22. The wireless networking system of claim 5, each of the three or more Wi-Fi systems comprising a system-on-a-chip.

* * * * *